W. T. DELONY.
HEADLIGHT.
APPLICATION FILED MAR. 14, 1922.
1,435,108.
Patented Nov. 7, 1922.
2 SHEETS—SHEET 2.
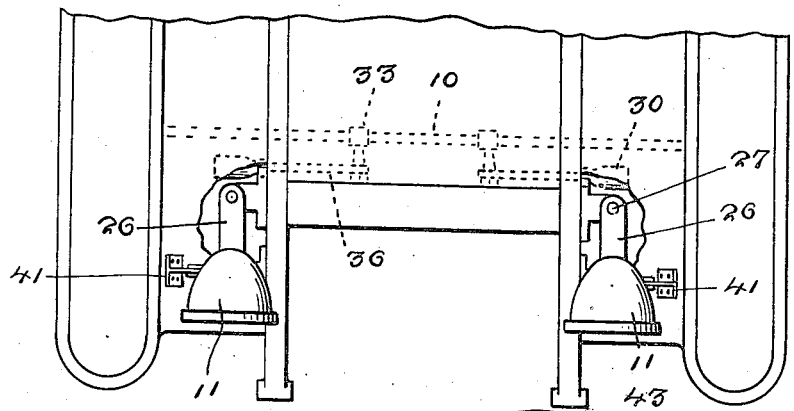
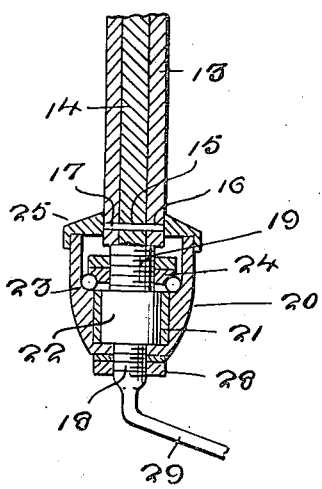
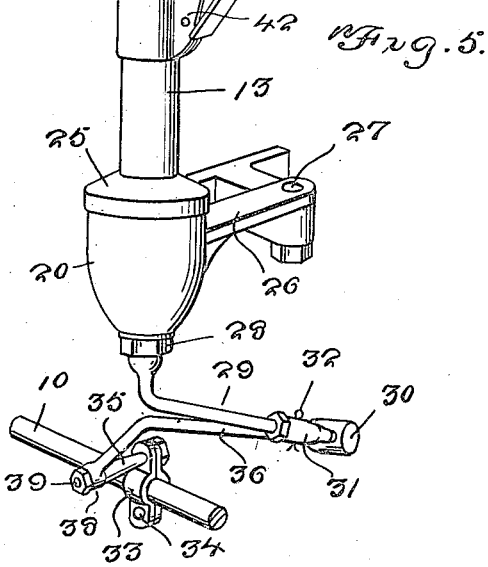
W. T. Delony
INVENTOR
BY Victor J. Evans
ATTORNEY
WITNESS:

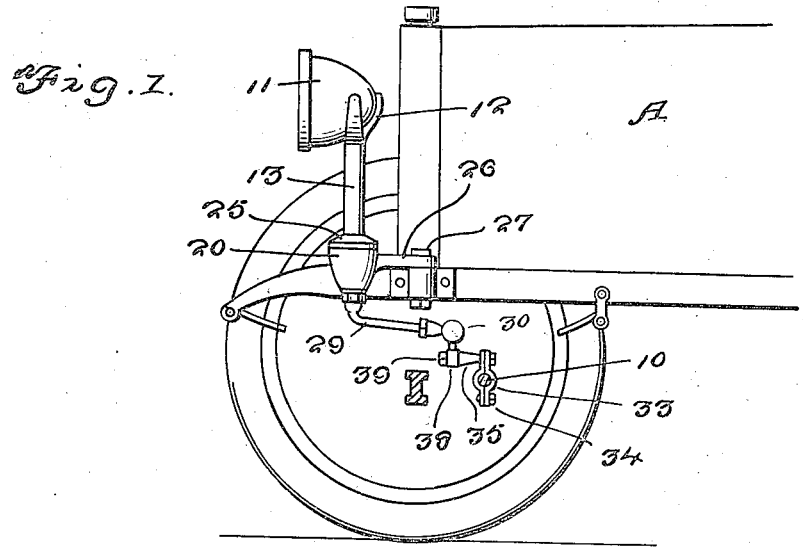
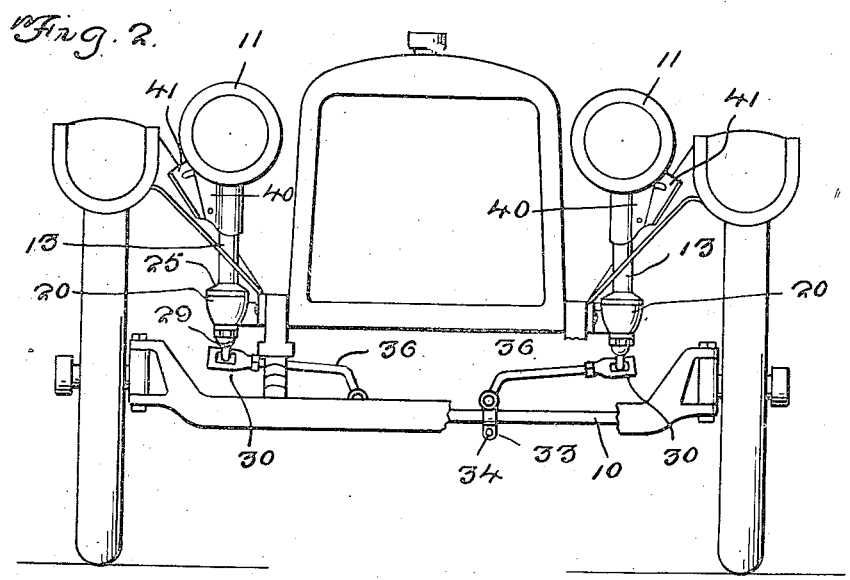
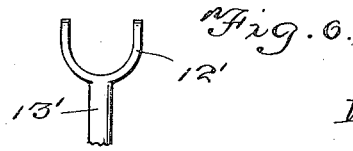

Patented Nov. 7, 1922.

1,435,108

UNITED STATES PATENT OFFICE.

WILLIAM T. DELONY, OF PENSACOLA, FLORIDA.

HEADLIGHT.

Application filed March 14, 1922. Serial No. 543,823.

*To all whom it may concern:*

Be it known that I, WILLIAM T. DELONY, a citizen of the United States, residing at Pensacola, in the county of Escambia and State of Florida, have invented new and useful Improvements in Headlights, of which the following is a specification.

This invention relates to a dirigible head lamp for motor operated vehicles, the invention residing in the construction, combination and arrangement of parts constituting the connection between the lamp posts and the steering mechanism of the machine, whereby the lamp will be adjusted simultaneously with the steering of the machine with a view of illuminating that portion of the roadway about to be followed by the machine.

The nature and advantages of the invention will be better understood when the following detailed description is read in connection with the accompanying drawings, and wherein like numerals of reference indicate similar parts in the several views.

In the drawings forming part of this application:

Figure 1 is a fragmentary side elevation of a motor vehicle, showing the head lamps associated therewith in accordance with the present invention.

Figure 2 is a front elevation.

Figure 3 is a top plan view.

Figure 4 is an enlarged side elevation of one of the lamps and its associated parts.

Figure 5 is a perspective view of the headlight mounting.

Figure 6 is a fragmentary detailed view of a lamp post.

Referring to the drawings in detail A indicates a portion of a motor vehicle, wherein 10 represents the rod connecting the steering knuckles, and 11 the headlamps for the vehicle. The lamps are connected with the steering mechanism in a manner to be simultaneously turned incident to the steering of the vehicle. As the supporting means and connection between each lamp and the steering mechanism of the vehicle, is identical, a detail description of one will suffice for both.

Each lamp 11 is attached to forked extremity 12 of the lamp posts 13, and this post which is tubular is received by a standard 14. The standard is provided with a transverse bore 15 which registers with openings 16 in the post 12, a pin 17 being passed through these openings and the bore 15 to hold the parts operatively associated. The standard 14 is formed with an enlarged smooth portion 22 adjacent one end thereof, while at the opposite end of the enlarged portion, the standard 14 is threaded as at 18 and 19. The threaded portion 19 is of greater diameter than the threaded portion 18. The posts 13 and standard 14 are passed through a cup shaped member 20 and supported for partial rotation, the standard being connected with the rod 10 in a manner to be hereinafter described, so that the lamps will be simultaneously turned in either direction incident to the steering of the vehicle.

A bushing 21 surrounds the enlarged portion 22 of the standard, and is interposed between the standard and the ball race 23 which is located within the cup shaped member 20. An adjusting cone indicated at 24 is threaded on the reduced threaded portion 18 of the standard 14 and also positioned within the cup shaped member for cooperation with the ball race 23 as will be readily understood. A dust cap or the like indicated at 25 closes the upper end of the cup shaped member 20 as shown. Projecting from the cup shaped member is a bracket arm 26 which is provided with an opening through which the fastening element 27 is passed for securing the arm 26 to an appropriate part of the vehicle. The cup shape member 20 is supported upon the standard by means of nuts 28 which are associated with the threaded portion 19 of the standard beneath the cup as shown.

Projecting obliquely from the lower end of the standard 14 is an arm 29 and the latter is associated with a ball and socket device. This ball and socket device is indicated at 30 and projecting therefrom is an interiorly threaded tubular member 31 which receives the threaded extremity of the arm 29. This arm is provided with an opening which registers with openings in the tubular member 31 to receive a cotter pin or the like 32 to prevent relative rotation between said parts.

Engaging the connecting rod 10 of the steering mechanism is a clamp 33 which consists of two parts secured together at one end by means of a bolt 34, the opposite end being associated by means of a stud bolt 35 which projects an appreciable distance in advance of the rod. A substantially L- shaped rod is provided, the long branch 36 of which is threaded at one end and is associated with the ball and socket device 30, while the short branch terminates to provide a loop or eye 38 which receives the stud bolt 35. A nut 39 is secured to this bolt in advance of the loop or eye 38 as shown. The construction of the rod is such that it provides for a straight and even movement with the ball and socket device which is connected with the turning arm 29.

Each lamp is further braced from the fender of the vehicle by means of a wing shaped bracket including the sections 40 and 41, the former being formed to provide a sleeve like portion adapted to embrace the posts 13, while the section 41 is pivoted at one end as at 42 making it possible to adjust the bracket for cars of different makes. The section 41 is slotted as at 42 to receive a pin 43 carried by the fixed section 40. The section 41 is adapted to be secured to the fender of the vehicle in any suitable manner.

From the foregoing description when taken in connection with the accompanying drawings, it will be manifest that when the connecting rod 10 is shifted incident to the steering of the vehicle, that the lamp post 13 will be simultaneously rotated in the proper direction to maintain the light rays on that part of the roadway about to be followed by the vehicle. While it is believed that the nature of the invention will be readily apparent I desire to have it understood that I do not limit myself to what is herein shown and described and that such changes may be resorted to when desired as fall within the scope of what is claimed.

What I claim is:

In a dirigible headlamp for motor vehicles, the combination of a bracket, a cup shaped member supported by said bracket and counter bored, a ball race arranged within the counter bored portion of said member, a lamp post passed through said member and mounted for partial rotation, a ball and socket device, a turning arm projecting from one end of the lamp post and connected with the ball and socket device, means for connecting said device with an element of the steering mechanism, and an adjustable wing shaped bracket carried by said post and adapted to be secured to the adjacent fender of the vehicle for the purpose specified.

In testimony whereof I affix my signature.

WILLIAM T. DELONY.